Figure 1:
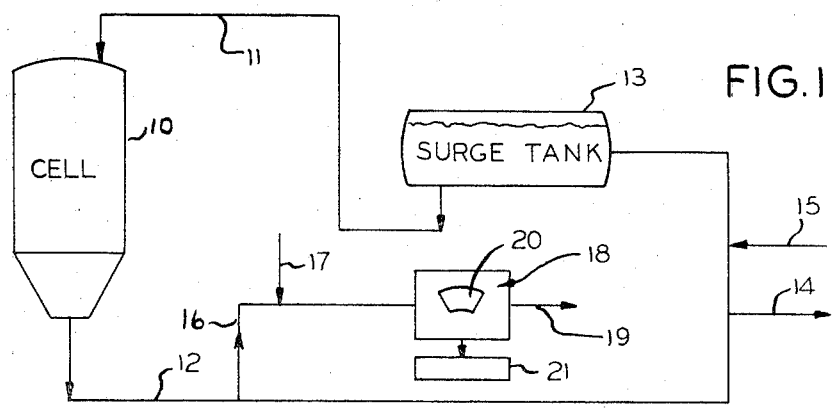

United States Patent

[11] 3,572,932

| [72] | Inventor | Edward E. Johnson |
| | | Sweeny, Tex. |
| [21] | Appl. No. | 850,193 |
| [22] | Filed | Aug. 14, 1969 |
| [45] | Patented | Mar. 30, 1971 |
| [73] | Assignee | Nalco Chemical Company |
| | | Chicago, Ill. |

[54] METHOD OF MEASURING ACTIVE GRIGNARD CONCENTRATION OF A GRIGNARD ELECTROLYTE
14 Claims, 2 Drawing Figs.

[52] U.S. Cl. ............................................. 356/74, 204/59
[51] Int. Cl. ............................................. B01k 1/00, G01j 3/00
[50] Field of Search ............................................. 356/74, 77, 96, 51, 181; 204/59

[56] References Cited
UNITED STATES PATENTS
| 3,007,858 | 11/1961 | Braithwaite ................. | 204/59 |
| 3,256,161 | 6/1966 | Braithwaite ................. | 204/59 |

OTHER REFERENCES
Vlismas et al. " The Determination of Grignard Reagent Concentration by an Acidimetric Double Titration Method," Journal of Organometallic Chemistry 10 (2) 1967, pages 193-197

*Primary Examiner*—Ronald L. Wibert
*Assistant Examiner*—F. L. Evans
*Attorneys*—Kinzer, Dorn and Zickert, John G. Premo and Charles W. Connors ABSTRACT: The active Grignard concentration in an electrolyzed Grignard electrolyte is measured by mixing a sample of the electrolyte with a solution of an oxidation-reduction indicator and subjecting the mixture to spectrophotometric analysis to determine the percent transmittance which is directly related to the Grignard concentration.

Patented March 30, 1971 3,572,932

INVENTOR
EDWARD E. JOHNSON

BY
Kinger, Dorn & Zickert
ATTORNEYS

METHOD OF MEASURING ACTIVE GRIGNARD CONCENTRATION OF A GRIGNARD ELECTROLYTE

This invention relates in general to the production of organo metallic compounds, such a tetraalkyl lead compounds by electrolyzing a solution of a Grignard reagent in the presence of a sacrificial lead anode, and more particularly to monitoring the active Grignard concentration in the electrolyte, and still more particularly to a method of quickly measuring the Grignard concentration at the cell during cell operation.

The efficient production of organometallic compounds by electrolyzing a Grignard electrolyte in the presence of a sacrificial anode requires monitoring of the Grignard concentration. More specifically, manufacture of tetraalkyl lead compounds, such a tetramethyl lead and tetraethyl lead, requires electrolyzing of a methyl or ethyl Grignard electrolyte in the presence of a sacrificial lead anode in a suitable electrolytic cell. The cell may be of a type disclosed in U.S. Pat. Nos. 3,287,249 and 3,368,961 or any other known electrolytic cell capable of producing organometallic compounds.

The production of tetramethyl or tetraethyl lead compounds in an electrolytic cell involves the continuous operation of the cell for a period of about 14 to 15 hours, or more or less, depending generally upon the amount of electrolyte defining the initial cell charge. At the beginning of a cell run, the active Grignard concentration in a Grignard electrolyte may be amount 1.50 millimoles per gram. As the cell run progresses, the Grignard concentration diminishes until it reaches a minimum operating level near the end of the run. Should the Grignard concentration go below 0.01 millimoles per gram, there is a danger of shorting out the cell which would necessitate shutdown and reconditioning of the cell before it could be again placed into productive operation. It becomes apparent that a cell run should be ended before the Grignard concentration reaches a level that might cause shorting out of the cell. Preferably, a cell run should be ended when the concentration reaches a level of about 0.02 to 0.04 millimoles per gram concentration.

Heretofore, Grignard concentration has been measured by titrating a sample of the electrolyte. It should be recognized that titration requires laboratory work which involves some time, and therefore the results of titration resting become available at some time period beyond the time when the sample was drawn from the electrolyte. If the Grignard concentration is near the danger point of shorting out the cell, the timelag for titrating might be too long and result in shorting out of a cell before the results are obtained. When measuring Grignard concentration by titration, it has been customary to shut down cell operation at the 0.04 to 0.06 millimoles per gram level.

The present invention overcomes the heretofore known difficulties by permitting the Grignard concentration measurement to be made at the cell and within a period of time to enable the cell run to extend as long as possible without causing shorting out. Heretofore, it has been necessary to cut short a cell run in order to avoid the possibility of shorting out a cell, thereby preventing the full use of a Grignard electrolyte. The method of measuring Grignard concentration of the invention avoids a possible cell shorting, while at the same time permitting the cell run to extend as long as possible. In fact, it has been heretofore necessary to shut down cell operation when a measurement by titration resulted in a 0.04 to 0.06 millimole per gram of Grignard concentration, while under the present invention, the cell can be shut down when the concentration reaches the level of about 0.02 to 0.04 millimoles per gram.

The method of the invention includes the preparation of a solution of an oxidation reduction indicator, the mixing of the solution with a sample of the electrolyte and the making of a spectrophotometric reading to determine percent transmittance of the mixture which is directly related to the Grignard concentration. Thus, the invention involves the measurement of the Grignard concentration of a cell effluent during electrolysis. By the use of a spectrophotometer, the measurement can be accomplished by either spot sampling or on a flow through cell for continuous measurement during the cell run.

It is therefore an object of the present invention to provide a new and improved method of monitoring Grignard concentration in a Grignard electrolyte during the electrolyzing of the electrolyte in the presence of a sacrificial lead anode for producing tetraalkyl lead compounds.

Another object of this invention is in the provision of a method of measuring the Grignard concentration in a Grignard electrolyte by use of a spectrophotometer.

Still another object of this invention is in the provision of a method of measuring the Grignard concentration in a Grignard electrolyte by mixing a sample of the electrolyte with a solution of an oxidation-reduction indicator and subjecting the mixture to spectrophotometric analysis.

Figure 2:
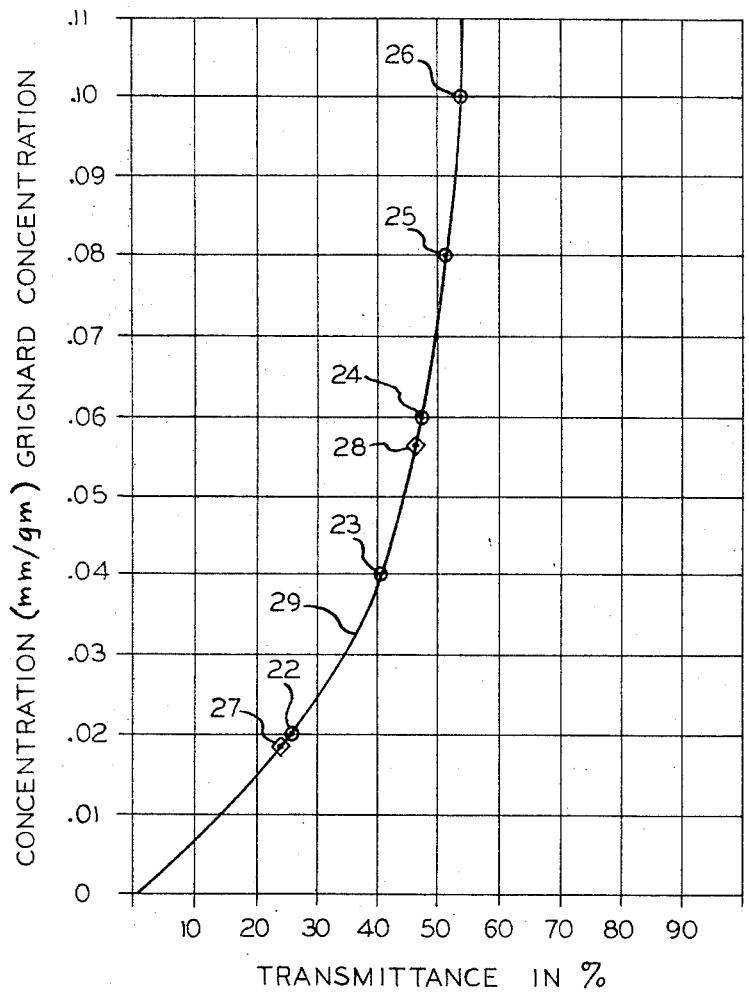

Other objects, features and advantages of the invention will be apparent from the following detailed disclosure, taken in conjunction with the accompanying sheet of drawing, wherein like reference numerals refer to like parts, in which:

FIG. 1 is a diagrammatic flow diagram of an electrolytic cell system with some parts omitted for purposes of clarity, and illustrating the manner of taking a sample and monitoring the Grignard concentration of the electrolyte in accordance with the method of the invention; and FIG. 2 is a graphical example of the conversion of spectrophotometric readings into the amount of Grignard concentration.

The monitoring of a Grignard electrolyte to determine the Grignard concentration therein during the production of tetramethyl and tetraethyl lead compounds is important in order to provide the most efficient and economical production of the compounds. Termination of a cell run prematurely, such as when the Grignard concentration may be at a level of 0.04 to 0.06 millimoles per gram reduces the production potential since the Grignard electrolyte could be further electrolyzed, at least until the Grignard concentration reaches the level of about 0.02 to 0.04 millimoles per gram, and as long as the concentration does not go below 0.01 millimoles per gram. The present invention, in replacing the heretofore known titration method of measuring Grignard concentration, enables the cell run to be extended until the Grignard concentration is at the lowest safe level by enabling spot for continuous sampling of the electrolyte at the cell for immediate measurement analysis by use of a spectrophotometer.

Before subjecting the electrolyte to a spectrophotometric analysis, it is mixed with a solution of an oxidation-reduction indicator. In a tetramethyl cell with methyl Grignard electrolyte, it has been found that methylene blue is satisfactory while in a tetraethyl cell with ethyl Grignard electrolyte, 1,10-phenanthroline monohydrate reagent (ACS) is satisfactory. It should be appreciated that any other suitable oxidation-reduction indicator may be employed, so long as it will provide sufficiently accurate measurements.

The oxidation-reduction indicator is prepared in solution with a solvent that is compatible with the electrolyte. With respect to methyl and ethyl Grignard electrolytes, such as the types disclosed in the aforementioned U.S. Pat. No. 3,380,900, the indicators are prepared in dry tetrahydrofuran ether. A satisfactory solution combines about 5 grams of an indicator with about 1 gallon of tetrahydrofuran ether. The sample electrolyte is diluted with the solution of the indicator, such as about 6 parts of the solution to about 1 part of the electrolyte. Thereafter, the mixture of indicator and electrolyte is subjected to spectrophotometric analysis. The percent transmittance reading is then converted to a millimoles per gram reading for the active Grignard concentration.

Referring to FIG. 1, the invention may be further illustrated wherein cell effluent such as methyl or ethyl Grignard electrolyte is recirculated through an electrolytic cell 10 by suitable pumps and valves. A cell effluent is introduced at one end of the cell such as at the top end as shown, through an inlet line 11 and discharged from the cell through an outlet line 12 to a surge tank 13. The inlet line 11 is connected to the surge tank. At the end of a cell run, the old effluent may be withdrawn from the system at the discharge 14 and a new effluent for a subsequent run may be injected into the system at the inlet 15.

The method of the invention involves withdrawing a sample electrolyte through the sample line 16, mixing the solution of the oxidation-reduction indicator with the electrolyte by injecting it into the sample line at 17, and subjecting the diluted electrolyte to spectrophotometric analysis by the spectrophotometer 18. Following spectrophotometric analysis, the diluted electrolyte may be discharged to waste through waste line 19. During the taking of a spectrophotometric analysis, the diluted electrolyte must be isolated from the atmosphere, and therefore it may be placed in a closed container or may be blanketed with dry nitrogen. The spectrophotometer includes a readout window 20 that may be calibrated to read directly the Grignard concentration in millimoles per gram. Alternately the readout window might read percent transmittance of the sample electrolyte which can be converted by a suitable graph or table to millimoles per gram. The sampling line 16 may be arranged to take spot samples of the electrolyte or to continually sample the electrolyte during electrolysis. Moreover, the spectrophotometer may have an output to a control 21 that would upon detecting a predetermined level of Grignard concentration cause shutting off of the current to the cell 10, pumping of the old effluent out of the system through the discharge line 14, pumping into the system new effluent through the line 15, turning the current to the cell back on, and monitoring the concentration in the next run. This would eliminate the necessity of manually controlling the recharging of the system, although it should be appreciated that the invention contemplates such a possibility.

An example of measuring the Grignard concentration in accordance with the method of the invention may be more clear upon reference to FIG. 2. This graph plots transmittance in percent by spectrophotometric analysis against concentration in millimoles per gram of active Grignard. A spectrophotometer measures transmittance of the sample electrolyte as diluted by the solution of an oxidation-reduction indicator at a wavelength in the region of 540 millimicrons. The standards for subsequent application to spectrophotometric analysis includes points 22, 23, 24, 25 and 26, wherein these samples were prepared, checked for transmittance, and then titrated to determine Grignard concentration. Points 27 and 28 indicate samples that were taken from a system and read on the spectrophotometer, wherein the Grignard concentration was 0.019 and 0.056 respectively. The curve 29 connected along the points of the standards set up the points for reading directly by transmittance when taking spectrophotometric readings. The titration method for measuring concentration is no more accurate than ±0.002. The samples 27 and 28, later were checked by titration to have respectively, 0.02 and 0.06 millimoles per gram Grignard concentration. The data shown on this graph concerns an ethyl Grignard electrolyte, wherein a 1,10-phenanthroline oxidation-reduction indicator was employed. It should be now more clearly appreciated that the readout of the spectrophotometer, which measures transmittance, can be calibrated to read directly in millimoles per gram.

The monitoring system shown in FIG. 1, would include suitable pumps and valves in order to obtain the desired flow and sampling of the electrolyte.

It will be understood that modifications and variations may be effected without departing from the scope of the novel concepts of the present invention.

I claim:

1. The method of measuring the Grignard concentration in a Grignard electrolyte electrolyzed in an electrolytic cell in the presence of a sacrificial lead anode which comprises, drawing a sample of the electrolyte, preparing a solution of an oxidation-reduction indicator, mixing said solution of an oxidation-reduction indicator with said sample, maintaining the mixture isolated from the atmosphere, making a spectrophotometric reading of the mixture to determine the Grignard concentration.

2. The method as defined in claim 1, wherein the indicator is prepared in solution with a solvent compatible with the electrolyte.

3. The method as defined in claim 2, wherein the solvent is tetrahydrofuran ether.

4. The method as defined in claim 3, wherein the solution includes about 5 grams indicator to 1 gallon solvent.

5. The method as defined in claim 4, wherein the mixture includes about 6 parts solution to 6 part electrolyte.

6. The method as defined in claim 5, wherein the step of maintaining the mixture isolated from the atmosphere includes placing the mixture in a closed container.

7. The method as defined in claim 5, wherein the step of maintaining the mixture isolated from the atmosphere includes blanketing the mixture with dry nitrogen.

8. The method as defined in claim 5, wherein the electrolyte is methyl Grignard and the indicator is methylene blue.

9. The method as defined in claim 1, wherein the electrolyte is ethyl Grignard and the indicator is 1,10-phenanthroline monohydrate.

10. The method of measuring the Grignard concentration in a Grignard electrolyte electrolyzed in an electrolytic cell in the presence of a sacrificial lead anode which comprises, preparing in solution an oxidation-reduction indicator by mixing about 5 grams indicator in about 1 gallon solvent, drawing a sample of the electrolyte, mixing about 6 parts solution in about 1 part electrolyte, maintaining the mixture isolated from the atmosphere, making a spectrophotometric reading of the mixture in the region of 540 millimicrons in percent transmittance, and converting the percent transmittance reading to millimoles per gram of Grignard concentration.

11. The method of claim 10, wherein the electrolyte is methyl Grignard, the indicator is methylene blue, and the solvent is tetrahydrofuran ether.

12. The method of claim 10, wherein the electrolyte is ethyl Grignard, the indicator is 1,10-phenanthroline monohydrate, and the solvent is tetrahydrofuran ether.

13. The method of continually measuring the Grignard concentration in a Grignard electrolyte electrolyzed in an electrolytic cell in the presence of a sacrificial lead anode which comprises, continually drawing a sample from the electrolyte, and continually making spectrophotometric readings of the electrolyte in the presence of an oxidation-reduction indicator solution to determine the Grignard concentration.

14. The method of operating an electrolytic cell and continually measuring the Grignard concentration in a Grignard electrolyte electrolyzed in the electrolytic cell in the presence of a sacrificial lead anode which comprises, preparing a solution of an oxidation-reduction indicator and solvent, continually drawing a sample of the electrolyzed electrolyte, continually mixing the solution and electrolyte, continually making spectrophotometric readings of the electrolyte to determine Grignard concentration, and shutting off the cell current, pumping out the cell effluent, and pumping in new cell effluent when the Grignard concentration drops to a predetermined level.

UNITED STATES PATENT OFFICE

CERTIFICATE OF CORRECTION

Patent No. 3,572,932　　　　　　　　　　Dated March 30, 19

EDWARD E. JOHNSON

It is certified that error appears in the above identified patent and that said Letters Patent are hereby corrected as shown below:

In the Specification, Column 1, line 19, add the following sentence at the end of the paragraph: --The electrolyte may be of a type disclosed in U.S. Patent 3,380,900 or of any other suitable type capable of producing tetraalkyl lead compoun line 26, "amount" should be --about--; line 41, "resting" should be --testing--;
Column 2, line 40, "for" should be --or--.

In the Claims, Column 4, line 16, "6" (second occurrence) should be --1--.

Signed and sealed this 24th day of August 1971.

(SEAL)
Attest:

EDWARD M. FLETCHER, JR.　　　　　　WILLIAM E. SCHUYLER, JR.
Attesting Officer　　　　　　　　　　Commissioner of Patents